UNITED STATES PATENT OFFICE 2,827,360
Patented Mar. 18, 1958

2,827,360
MANUFACTURE OF HIGH PURITY BARIUM METATITANATE

Warren Barnett Blumenthal, Niagara Falls, N. Y., assignor to National Lead Company, New York, N. Y., a corporation of New Jersey No Drawing. Application November 3, 1954
Serial No. 466,698

9 Claims. (Cl. 23—51)

The invention of the present application relates to barium metatitanate. It is particularly concerned with a process for producing barium metatitanate of high purity from raw materials that may contain considerable amounts of undesirable impurities.

Barium metatitanate has, in recent years, become of considerable importance as the principal or essential ingredient of various ceramic dielectric and piezoelectric bodies. For these purposes the purity of the barium metatitanate is highly important since even tenths of a percent of certain impurities will markedly influence the dielectric constant. (Graf: Effect of Impurities Upon the Dielectric Properties of Barium Titanate, Ceramic Age, December 1951, page 16 et seq.) Accordingly there has developed a great demand for an inexpensive process for the manufacture of barium metatitanate of high purity.

It is an object of the present invention to provide such a process.

A further object of the present invention is to provide a process for producing barium metatitanate of high purity which does not require the use of highly purified raw materials.

Another object of the invention is to provide an inexpensive and practical method of preparing barium titanyl oxalate from which barium metatitanate of high purity may be easily produced by calcination.

Other objects and advantages of the present invention will be apparent from the following description thereof.

Broadly, the novel process of the present invention starts with titanium dioxide and comprises the steps of producing an acid-soluble titanium compound by calcining the titanium dioxide with barium oxide, dissolving the acid-soluble compound in hydrochloric acid, treating the solution with oxalic acid to precipitate barium titanyl oxalate, and calcining the latter to obtain a very pure barium metatitanate. Details, from which the manner of carrying out the invention will be more readily understood, are set forth in the following examples.

EXAMPLE 1

A mixture of finely divided titanium dioxide and barium carbonate in a ratio by weight of 2:5 is run through an oil-fired rotary kiln. The kiln temperature may be about 480° C. at the feed end and about 1150° C. at the discharge end. The speed is adjusted to give a retention time of approximately 6 hours. Under the conditions present carbon dioxide is evolved from the barium carbonate and the barium oxide reacts with the titanium dioxide. There results a barium-titanium-oxygen product of varying composition that contains the non-volatile impurities in the raw materials as well as impurities picked up in processing. Although the composition of the calcined product varies, a typical analysis will show about 63% BaO, 34% $TiO_2$ and 3% impurities.

The following two examples set forth the further treatment of the crude, calcined product obtained in Example 1 necessary in order to obtain barium metatitanate of high purity.

EXAMPLE 2

46.6 grams of the crude, calcined material produced by the process set out in Example 1 is stirred into 100 ml. of concentrated hydrochloric acid (1.182 sp. gr.) which has been heated to 95° C. The mixture is agitated for about twenty minutes after addition is complete. Then 100 ml. of water heated to 95° C. is added to the mixture and stirring is continued for approximately another ten minutes. The slurry is thereafter allowed to stand for several hours to permit completion of the solution of the calcined material and is subsequently filtered. After washing the residue with about 20 ml. of hot water the filtrate and wash water are combined and their volume is increased to 310 ml. while the temperature of the solution is raised to 65° C. A warm solution (65° C.) of 78 grams of oxalic acid dihydrate ($H_2C_2O_4 \cdot 2H_2O$) in 1400 ml. of water is then added slowly, while stirring, to the warm solution of barium and titanium chlorides. A precipitate of barium titanyl oxalate ($BaTiO(C_2O_4)_2 \cdot 2H_2O$) results. Stirring of the mixture is continued for about 15 minutes after which it is filtered to separate the precipitate. The filter cake is washed with water until the effluent is free of chlorides and is then dried at 100° C. Barium metatitanate is produced by heating the dried mass thus obtained to 1050° C. for about two hours.

EXAMPLE 3

While holding the temperature at 75° C. a mixture of 46.6 grams of the crude calcined product of Example 1 with 120 ml. of concentrated hydrochloric acid (1.182 sp. gr.) is stirred for 1 hour. The slurry is then diluted with 150 ml. of water at 75° C. and stirring is continued for 5 hours while maintaining that temperature. Thereupon the residue is filtered from the resultant solution of barium and titanium chlorides and is washed with about 20 ml. of hot water. The volume of the solution comprising the combined filtrate and wash water is then increased to 310 ml. and the temperature thereof is adjusted to 65° C. While stirring this soltuion, an aqueous solution of oxalic acid dihydrate, containing 50.5 grams of the acid in 1000 ml. of solution, at the same temperature is added slowly. The slurry of barium titanyl oxalate thus obtained is stirred for about 15 minutes. It is then filtered off and after washing with water until the effluent is chloride-free is dried at 100° C. When the dried barium titanyl oxalate is heated at about 1050° C. for about 2 hours a dielectric grade of barium metatitanate is obtained.

As indicated above the present novel process makes it possible to obtain from impure raw materials barium metatitanate which is remarkably free from impurities other than strontium. The purity of products prepared according to the present invention is illustrated in the following table in which the figures represent approximate percentages by weight.

*Table 1*

| Oxide Impurity | A | A' | B | B' | C |
|---|---|---|---|---|---|
| $Al_2O_3$ | 0.005 | 0.6 | 0.005 | 0.6 | 0.005 |
| CaO | 0.005 | 0.01 | 0.005 | 0.01 | 0.005 |
| CuO | 0.002 | 0.005 | 0.002 | 0.002 | 0.001 |
| $Fe_2O_3$ | 0.005 | 0.03 | 0.003 | 0.01 | 0.007 |
| $K_2O$ | | 0.05 | 0.02 | 0.05 | 0.005 |
| $Li_2O$ | | | | 0.02 | |
| MgO | 0.002 | 0.05 | 0.002 | 0.05 | 0.005 |
| $MnO_2$ | 0.0005 | 0.001 | | 0.0005 | |
| $Na_2O$ | 0.005 | 0.3 | 0.01 | 0.6 | 0.005 |
| PbO | | 0.001 | | 0.001 | |
| $SiO_2$ | 0.07 | 0.4 | 0.03 | 0.4 | 0.04 |
| $SO_3$ | | 0.4 | | 0.4 | |
| SrO | 0.3 | 0.5 | 0.25 | 0.5 | 0.005 |
| Total | 0.39 | 2.35 | 0.33 | 2.64 | 0.078 |

NOTES.—$SO_3$ was determined by chemical analysis and the other impurities spectroscopically. A blank "_____" indicates that none was detected.

In Table I, columns A and B set forth the impurity content of 2 samples of barium metatitanate produced in accordance with the present invention. For comparison, columns A' and B', respectively, give the impurity content of the raw materials from which the products of columns A and B were produced as determined in the crude calcined product obtained by the process of Example 1. Column C, also included for comparison, gives the impurity content of a barium metatitanate product produced from special, chemically pure materials.

It will be seen by comparing the analyses set forth in Table I that the barium metatitanates of columns A and B are, except for their strontium contents, substantially as pure as the barium metatitanate of column C which was prepared from chemically pure materials and are of course much purer than the raw materials used for their manufacture. So far as the strontium content is concerned, it is not in many instances a disadvantage since strontium oxide in minor proportions is used in a large number of barium titanate dielectric bodies. Indeed, it is desired in many such bodies. Barium titanate products obtained by the process of the present invention, such as those represented in columns A and B of Table I, when chemically analyzed are found to have a $BaO:TiO_2$ ratio within 1% of the stoichiometric ratio of 1:1. Moreover, when examined by X-ray diffraction they show no solid phase other than barium metatitanate.

The conditions under which the process steps in the examples are carried out may be varied considerably. Thus, for example, the calcination described in Example 1 may be carried out with the hot end of the kiln at any desired temperature between about 1035° C. and 1260° C., although at temperature in the lower portion of this range the reaction time must be somewhat longer to ensure practically complete combination and solubilization of the $TiO_2$. In Examples 2 and 3 the temperatures, times, dilutions and the like may also be varied. It should be noted, however, that the barium titanyl oxalate must be heated to at least about 700° C. to obtain a product having a low volatile content of volatile matter and recognizably crystalline structure. The following table gives the effects of heating barium titanyl oxalate to various temperatures.

Table II

| Temperature, ° C. | Percent Volatiles Retained | Average Particle Size, Microns [1] | Crystal Phases Present (X-Ray) |
| --- | --- | --- | --- |
| 500 | 12.94 | 5-10 | Amorphous. |
| 600 | 11.44 | Not more than 5 | Do. |
| 700 | 2.98 | Not more than 2 | $BaTiO_3$, crystalline. |
| 800 | 0.36 | Not more than 1 | Do. |
| 900 | 0.19 | do | Do. |
| 1,000 | 0.08 | do | Do. |

NOTE.—[1] Determined microscopically.

From this data it is evident that increasingly pure barium metatitanate is obtained on calcining the barium titanyl oxalate at progressively higher temperatures. Consequently a temperature of at least 1000° C. is preferred for such calcination.

It will be apparent from the foregoing that the process of the present invention is extremely useful in the production of barium metatitanate of high purity, such as is suitable for dielectric and piezoelectric uses. The process is simple and requires no very expensive materials so that its commercial use is practical. As starting materials the use of barium carbonate and mineral rutile is convenient as both are commercially available at comparatively low prices. However, other barium salts which under the calcination conditions form a barium-titanium-oxygen product soluble in hydrochloric acid as well as barium oxide and barium hydroxide may be used instead of barium carbonate. For the purpose of the reaction these may all be considered as being barium oxide. In like manner more or less purified titania may be used instead of mineral rutile.

Since, as pointed out above numerous variations or modifications may be made in the process set forth in the present application without departing from the spirit of the invention, the invention should not be construed narrowly or limited to the precise details set forth in the examples. It is rather intended that it should be interpreted as broadly as permitted by the appended claims.

I claim:

1. A process for manufacturing highly purified barium metatitanate which comprises calcining barium oxide and titanium dioxide at a temperature of at least about 1035° C., dissolving the product of said calcination by treatment with hydrochloric acid, removing insoluble impurities, precipitating barium titanyl oxalate from the solution, and calcining said barium titanyl oxalate to form barium metatitanate.

2. A process as set forth in claim 1 in which the barium oxide and titanium dioxide are calcined at a temperature of at least 1150° C.

3. A process as set forth in claim 1 in which the barium titanyl oxalate is calcined at a temperature of at least 1000° C.

4. A process for manufacturing highly purified barium titanyl oxalate which comprises calcining barium oxide and titanium dioxide at a temperature of at least about 1035° C., dissolving the product of said calcination by treatment with hydrochloric acid, removing insoluble impurities, and precipitating barium titanyl oxalate from the solution with oxalic acid.

5. A process for manufacturing highly purified barium metatitanate which comprises calcining barium oxide and titanium dioxide at a temperature of at least about 1035° C., dissolving the product of said calcination by treatment with hot concentrated hydrochloric acid, removing insoluble impurities, precipitating barium titanyl oxalate from the solution by addition of oxalic acid, and decomposing said barium titanyl oxalate by heating at a temperature of at least about 1000° C.

6. A process for manufacturing highly purified barium metatitanate which comprises treating with hydrochloric acid the product obtained by calcining barium oxide and titanium dioxide at a temperature of at least about 1035° C., removing impurities insoluble in the acid, precipitating barium titanyl oxalate from the solution, and calcining said barium titanyl oxalate to form barium metatitanate.

7. A process as set forth in claim 6 in which the barium titanyl oxalate is calcined at a temperature of at least about 1000° C.

8. A process for manufacturing highly purified barium titanyl oxalate which comprises treating with hydrochloric acid the product obtained by calcining barium oxide and titanium dioxide at a temperature of at least about 1035° C., removing impurities insoluble in the acid, and adding oxalic acid to the solution to precipitate barium titanyl oxalate therefrom.

9. A process for manufacturing highly purified barium metatitanate which comprises treating with hot, concentrated hydrochloric acid the product obtained by calcining barium oxide and titanium dioxide at a temperature of at least about 1035° C., removing impurities soluble in the acid, precipitating barium titanyl oxalate from the solution by addition of oxalic acid, and decomposing said barium titanyl oxalate by heating at a temperature of at least about 1000° C.

References Cited in the file of this patent

UNITED STATES PATENTS

| | | |
| --- | --- | --- |
| 2,027,812 | Crundall | Jan. 14, 1936 |
| 2,628,156 | Merker et al. | Feb. 10, 1953 |
| 2,695,240 | Oshry | Nov. 23, 1954 |
| 2,696,651 | Gravley | Dec. 14, 1954 |

FOREIGN PATENTS

| | | |
| --- | --- | --- |
| 691,257 | Great Britain | May 6, 1953 |